Aug. 19, 1941.   G. R. McDONALD   2,253,188
SYSTEM OF ELECTRIC DISTRIBUTION
Filed April 25, 1941
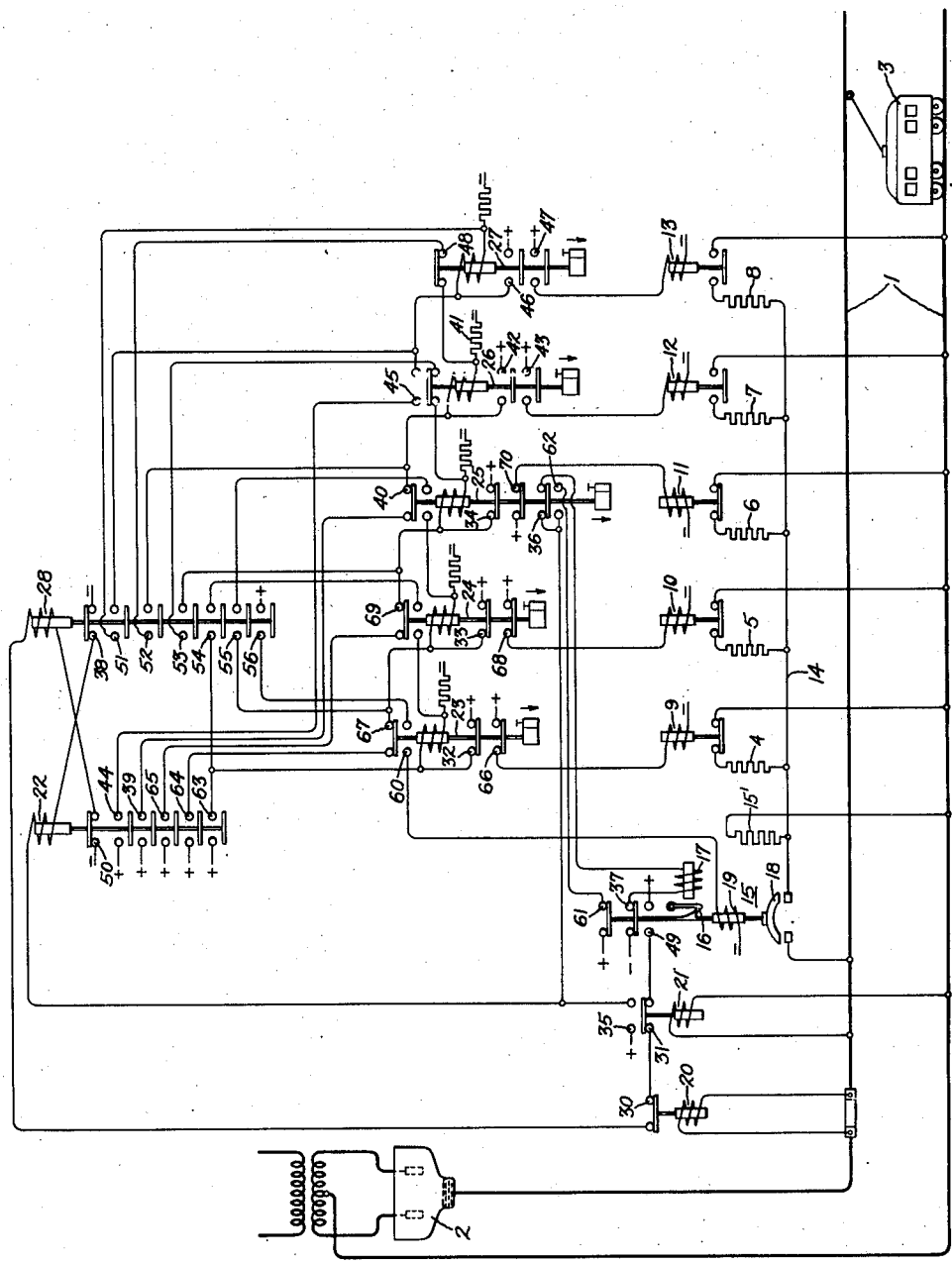
Inventor:
Gordon R. McDonald,
by Harry E. Dunham
His Attorney.

Patented Aug. 19, 1941

2,253,188

UNITED STATES PATENT OFFICE 2,253,188

SYSTEM OF ELECTRIC DISTRIBUTION

Gordon R. McDonald, Erie, Pa., assignor to General Electric Company, a corporation of New York Application April 25, 1941, Serial No. 390,362

8 Claims. (Cl. 171—97).

My invention relates to systems of electric distribution and particularly to such systems in which the distribution circuit is supplied by sources of current, such as mercury arc rectifiers, which can not receive current from the circuit, and the load supplied from the distribution circuit is equipped with regenerative braking apparatus.

In order to provide a circuit for the regenerative current when the regenerative braking apparatus is in service, various control arrangements have been provided heretofore for connecting suitable current consuming devices, such as resistors, across the distribution circuit upon the occurrence of suitable electric conditions of the distribution circuit indicative of the flow of regenerative current from the current to the distribution circuit.

One object of my invention is to provide in such a system of electric distribution an improved arrangement of apparatus for controlling the connections between a plurality of resistors and the distribution circuit so as to insure that a sudden decrease in the current consuming load connected to the distribution circuit, while regeneration is taking place, does not result in an excessive voltage being built up across the distribution circuit.

Another object of my invention is to provide in such a system of electric distribution an improved arrangement of apparatus for controlling the connections between a plurality of resistors and the distribution circuit so as to prevent the resistors from being intermittently connected to and disconnected from the distribution circuit under certain regenerating conditions.

When two electric locomotives, which are provided with regenerative braking control, are operating close together but in opposite directions on a grade, and the locomotive which is moving up the grade and, therefore, is taking current from the trolley circuit of the electric system supplying current to the locomotives, consumes all of the regenerative output of the other locomotive which is moving down the grade, no resistors have to be connected across the trolley circuit to prevent the voltage thereof from becoming excessive. If, under such operating conditions, the current to the locomotive, which is receiving current from the trolley circuit, is suddenly cut off for any reason, it is desirable to prevent the voltage of the trolley circuit from building up to an excessive value due to the sudden decrease in the current consuming load connected to the trolley circuit. In accordance with my invention, I provide an arrangement of apparatus whereby a sufficient number of resistors are immediately connected in parallel across the trolley circuit under such conditions so as to prevent the voltage of the trolley circuit from building up to an excessive value.

Also, when a locomotive is regenerating only a small amount of current, the value and even the direction of the current flow between the trolley circuit and the locomotive may vary due to changes in the train resistance as it goes around curves and straightens out on tangent track. In order to prevent such changes of short duration in the flow of current between the locomotive and the trolley circuit from effecting the disconnection and the subsequent reconnection of resistors, I provide, in accordance with my invention, an improved control arrangement so that the number of resistors connected to the distribution circuit can be decreased only in case the decrease in the regenerative current is of a permanent character.

My invention will be better understood from the following description taken in connection with the accompanying drawing, the single figure of which diagrammatically illustrates a system of electric distribution embodying my invention, and its scope will be pointed out in the appended claims.

Referring to the drawing, I represents a distribution circuit, shown as a trolley circuit, which is supplied with current from a mercury arc rectifier 2 and which is adapted to supply current to a plurality of electric locomotives 3 only one of which is shown in the drawing. Each electric locomotive is provided with suitable means, examples of which are well known in the art, whereby the motors of the locomotive may operate as generators and supply current to the trolley circuit I under certain operating conditions. For absorbing such regenerative current, I provide a plurality of resistors 4–8, inclusive, which are arranged to be connected in parallel across the circuit I. Suitable switches 9–13, inclusive, are respectively associated with the resistors 4–8, inclusive, for connecting them between one side of the circuit I and a common bus 14, and this common bus 14 in turn is arranged to be connected to the other side of the distribution circuit I by means of a high speed switching device 15 of any suitable construction. Also, a resistor 15' is permanently connected between said one side of the circuit I and the common bus. As shown in the drawing, the high speed switch 15 is normally held in its open position by a latch 16 which, when released by the energization of a release coil 17, allows the breaker to close its main contacts 18 very quickly. The switch 15 is arranged to be moved to its normally open position by means of an opening coil 19.

For controlling the operation of the switches 9–13, inclusive, and the high speed switch 15, I provide a current relay 20, which is connected so as to be responsive to the current output of the rectifier 2, and a voltage relay 21, which is connected to the distribution circuit 1 so as to be responsive to the voltage thereof. When the voltage across the circuit 1 exceeds a predetermined value, which is indicative of the fact that one or more of the locomotives is supplying regenerative current to the circuit 1, the relay 21 is arranged to close the high speed breaker 15 as described hereafter and to complete an energizing circuit for an associated control relay 22, which, when energized, is arranged to effect in a predetermined sequence the energization of a series of control relays 23–27, inclusive, associated respectively with the switches 9–13 inclusive. Each of the control relays 23–27, inclusive, is arranged in any suitable manner so that, after it is once energized, it remains in its energized position until the next succeeding control relay in the predetermined sequence is in its deenergized position and a relay 28 common to all of the control relays 23–27, inclusive, is energized in response to the voltage of the circuit 1 being below a predetermined value. Each of the control relays 23–27, inclusive, is also arranged so that, when it is energized, it completes an energizing circuit for the switch associated therewith. In accordance with my invention, each of the control relays 23–27, inclusive, is also arranged in any suitable manner so that its movement out of its energized position is delayed for a predetermined time after the relay is deenergized.

In accordance with my invention, I also control the operation of the control relays 23–27, inclusive, so that when the switch 15 is open, a predetermined number of these control relays, such as the relays 23–25, inclusive, and their associated switches 9–11, inclusive, are closed in order that the resistors 4–6, inclusive, associated with the closed switches 9–11, inclusive, and resistor 15' are simultaneously connected across the distribution circuit 1 by the subsequent closing of the high speed switch 15. This is accomplished by having the switch 15, when in its open position, complete through contacts of the switch 25, when it is open, an energizing circuit for the control relay 22. Also, in accordance with my invention, the circuit for the trip coil 17 of the high speed circuit breaker 15 is arranged to be completed when the control relay 25 is energized and the voltage across the circuit 1 exceeds a predetermined value, and a circuit is arranged to be completed for the opening coil 19 of the switch 15 when the control switch 23 is open and the common control relay 28 is energized. The circuit of the relay 28 in turn is so controlled that it is completed only when the high speed switch 15 is closed, the voltage across the circuit 1 is below a predetermined value and the current output from the rectifier 2 exceeds a predetermined value.

The operation of the arrangement shown in the drawing is as follows:

Under normal operating conditions, when the locomotive 3 is receiving current from the distribution circuit 1, the control devices are in the positions in which they are shown in the drawing. Since, under such conditions, the rectifier 2 is supplying current to the distribution circuit 1 at normal voltage, the contacts 30 of the current relay 20 and the contacts 31 of the voltage relay 21 are closed. In a manner which will be hereinafter described, the control relays 23, 24, and 25 are maintained in their energized positions under these operating conditions so that the switches 9, 10 and 11 are closed to connect the resistors, 4, 5, and 6 in parallel with resistor 15' between the common resistor bus 14 and one side of the distribution circuit 1. The common bus 14, however, is not connected to the other side of the distribution circuit at this time because the high speed switch 15 is open.

When the locomotive 3 starts to supply regenerative braking current to the distribution circuit 1, it causes the voltage thereof to increase above the normal operating value so that the rectifier 2 stops supplying current to the distribution circuit, thereby causing the relay 20 to open its contacts 30 and the voltage relay 21 opens its contacts 31 and closes its contacts 35, thereby completing an energizing circuit for the trip coil 17 of the high speed switch 15 through contacts 36 of the energized control relay 25 and the auxiliary contacts 37 of the switch 15. The energization of the trip coil 17 releases the latch 16 so that the switch 15 immediately closes and simultaneously connects the four resistors 4, 5, 6 and 15' in parallel across the distribution circuit 1. Preferably the number of resistors which are simultaneously connected across the distribution circuit by the high speed switch 15 is such as to prevent the voltage of the distribution circuit from building up to an extremely high value when the closing of the switch 15 is effected at a time when the locomotive 3 is supplying a large regenerative current to the distribution circuit.

The closing of the contacts 35 of the voltage relay 21 also completes an energizing circuit for the control relay 22 through the contacts 38 of the control relay 28. Therefore, if the voltage of the distribution circuit is not immediately restored to its normal value by the connection of the resistors 4, 5, 6 and 15' thereto, an energizing circuit is completed for the operating winding of the control relay 26 through contacts 39 of relay 22 and contacts 40 of relay 25 and resistor 41. By closing its contacts 42, relay 26 completes a locking circuit for its operating winding, and by closing its contacts 43, it completes an energizing circuit for the winding of switch 12 so that the resistor 7 is immediately connected across the distribution circuit 1 in parallel with the resistors 4, 5, 6 and 15'. In similar manner, if the contacts 35 of the voltage relay 21 remain closed after the switch 12 is closed, an energizing circuit is completed for the operating winding of the control relay 27 through contacts 44 of the relay 22 and the contacts 45 of the relay 26 so that the switch 13 is closed to connect the resistor 8 across the distribution circuit in parallel with the resistors 4, 5, 6, 7 and 15'.

When the regeneration decreases so that the distribution voltage is restored to normal and the rectifier 2 again supplies current to the distribution circuit, an energizing circuit is completed for the control relay 28 through contacts 49 of the switch 15, contacts 31 of the voltage relay 21, contacts 30 of the current relay 20 and contacts 50 of the relay 22. By closing its contacts 51–56, inclusive, relay 28 effects the successive disconnections of the resistors 3–4, inclusive, after which the switch 15 is opened. For example, if all of the resistors are connected in parallel across the distribution circuit when the relay 28 is energized, the closing of the contacts 51 of the relay 28 completes a shunt circuit around the operating winding of the control relay 27. A predetermined time after the winding of the relay 27 is deenergized, this relay opens its contacts 46 which are in the locking circuit of its operating winding and also its contacts 47 so that the switch 13 is opened to disconnect the resistor 8 from across the distribution circuit 1. If the disconnection of the resistor 8 does not cause the voltage relay 21 to open its contacts 31 and thereby deenergize the relay 28, a shunt circuit is completed around the operating winding of the relay 26 through the contacts 48 of the relay 27 and the contacts 52 of the relay 28. After a predetermined time interval, the relay 26 opens its contacts 43 so that the switch 12 is opened to disconnect the resistor 7 from across the distribution circuit 1. In a similar manner control relays 25, 24 and 23 are successively deenergized to effect the successive disconnections of the resistors 6, 5, and 4, respectively, from across the distribution circuit 1 when the relay 28 is energized. If the disconnection of the resistor 4 does not effect the deenergization of the relay 28, a circuit is immediately completed for the opening coil 19 of the switch 15 through the contacts 60 of the relay 23 and the contacts 56 of the relay 28 so that the common resistor bus 14 and resistor 15' are disconnected from the distribution circuit 1. When the switch 15 opens, an energizing circuit is immediately completed for the control relay 22 through the contacts 61 of the switch 15, contacts 62 of the relay 25 and the contacts 38 of the relay 28 which is deenergized as soon as the switch 15 opens its auxiliary contacts 49. By closing its contacts 63, 64 and 65, the relay 22 effects the successive energizations of the relays 23, 24 and 25 so that the switches 9, 10 and 11 are closed to connect the resistors 4, 5, and 6 in parallel with resistor 15' between the common resistor bus 14 and one side of the distribution circuit 1. The closing of the contacts 63 of the relay 22 completes an energizing circuit for the operating winding of the relay 23. By closing its contacts 32, the relay 23 completes a locking circuit for its operating winding, and by closing its contacts 66, the relay 23 completes an energizing circuit for the switch 9 so that the resistor 4 is connected between the common resistor bus 14 and one side of the distribution circuit 1. By closing its contacts 67, the relay 23 completes through the contacts 64 of the relay 22 an energizing circuit for the operating winding of the switch 24. By closing its contacts 33, the relay 24 completes a locking circuit for its operating winding, and by closing its contacts 68, the relay 24 completes an energizing circuit for the switch 10 so that the resistor 5 is connected between the common resistor bus 14 and one side of the distribution circuit 1. By closing its contacts 69, the relay 24 completes through contacts 65 of the relay 22 an energizing circuit for the control relay 25. By closing its contacts 34, the relay 25 completes a locking circuit for its operating winding, and by closing its contacts 70, the relay 25 completes an energizing circuit for the switch 11 so that the resistor 6 is connected between the common resistor bus 14 and one side of the distribution circuit 1. By opening its contacts 62, the relay 25 interrupts the energizing circuit of the control relay 22 so that further operation of the control relays 23–27, inclusive, is prevented until regeneration again occurs and causes the voltage relay 21 to effect the closing of the high speed switch 15 in the manner heretofore described.

While I have shown the contacts 62 as being associated with the control relay 25, it will be obvious to any one skilled in the art that they may be associated with any one of the control relays 23–27, inclusive, or any one of switches 9 to 13 inclusive, depending upon the number of resistors which it is desired to have simultaneously connected across the distribution circuit 1 by the closing of the high speed switch 15.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a distribution circuit, rectifier means for supplying current to said circuit, a load connected to said circuit capable of supplying regenerative current to said circuit, a plurality of resistors, means dependent upon the voltage of said circuit for connecting a predetermined number of said resistors in parallel, and means responsive to a predetermined electric condition of said circuit indicative that regenerative current is being supplied to said circuit for quckly effecting the simultaneous connection of said parallel connected resistors across said circuit.

2. In combination, a distribution circuit, rectifier means for supplying current to said circuit, a load connected to said circuit capable of supplying regenerative current to said circuit, a plurality of resistors, means dependent upon the voltage of said circuit for connecting a predetermined number of said resistors in parallel, and means responsive to the voltage of said circuit exceeding a predetermined value for effecting the simultaneous connection of said parallel connected resistors across said circuit.

3. In combination, a distribution circuit, rectifier means for supplying current to said circuit, a load connected to said circuit capable of supplying regenerative current to said circuit, a plurality of resistors, means for connecting a predetermined number of said resistors in parallel when none of said resistors is connected across said circuit, and means responsive to the voltage of said circuit for effecting the simultaneous connection of said parallel connected resistors across said circuit and thereafter varying in a predetermined sequence the number of resistors connected across said circuit so as to maintain the voltage thereof at a predetermined voltage.

4. In combination, a distribution circuit, rectifier means for supplying current to said circuit, a load connected to said circuit capable of supplying regenerative current to said circuit, a plurality of resistors, means for connecting a predetermined number of said resistors in parallel when none of said resistors is connected across said circuit, quick acting switching means for effecting the simultaneous connection of said parallel connected resistors across said circuit in response to the voltage of said circuit exceeding a predetermined value, and means controlled by the voltage of said circuit and the current supplied to said circuit by said rectifier for varying in a predetermined sequence the number of resistors connected across said circuit and for effecting the opening of said quick acting switching means when all but one of said resistors have been disconnected from across said circuit.

5. In combination, a distribution circuit, rectifier means for supplying current to said circuit, a load connected to said circuit capable of supplying regenerative current to said circuit, a plurality of resistors, means responsive to the voltage of said circuit exceeding a predetermined value for quickly connecting said resistors to said circuit in a predetermined order, and means dependent upon the voltage of said circuit being below a predetermined value for disconnecting said resistors from said circuit in a predetermined order and at a materially slower rate than the rate at which they are connected to said circuit.

6. In combination, a distribution circuit, rectifier means for supplying current to said circuit, a load connected to said circuit capable of supplying regenerative current to said circuit, a plurality of resistors, means responsive to the voltage of said circuit exceeding a predetermined value for quickly connecting said resistors to said circuit in a predetermined order, and means dependent upon the voltage of said circuit being below a predetermined value and the current supplied from said rectifier exceeding a predetermined value for disconnecting said resistors from said circuit in a predetermined order and at a materially slower rate than the rate at which they are connected to said circuit.

7. In combination, a distribution circuit, rectifier means for supplying current to said circuit, a load connected to said circuit capable of supplying regenerative current to said circuit, a plurality of resistors, means for connecting a predetermined number of said resistors in parallel when none of said resistors is connected across said circuit, quick acting switching means for effecting the simultaneous connection of said parallel connected resistors across said circuit and for thereafter quickly connecting additional resistors in a predetermined sequence across said circuit in response to the voltage of said circuit exceeding a predetermined value, and time delayed means dependent upon the voltage of said circuits being below a predetermined value for disconnecting said resistors from said circuit in a predetermined order.

8. In combination, a distribution circuit, rectifier means for supplying current to said circuit, a load connected to said circuit capable of supplying regenerative current to said circuit, a plurality of resistors, means for connecting a predetermined number of said resistors in parallel when none of said resistors is connected across said circuit, quick acting switching means for effecting the simultaneous connection of said parallel connected resistors across said circuit and for thereafter quickly connecting additional resistors in a predetermined sequence across said circuit in response to the voltage of said circuit exceeding a predetermined value, and time delayed means dependent upon the voltage of said circuits being below a predetermined value and the current supplied from said rectifier exceeding a predetermined value for disconnecting said resistors from said circuit in a predetermined order.

GORDON R. McDONALD.